United States Patent [19]

Kouzaki

[11] Patent Number: 5,446,476
[45] Date of Patent: Aug. 29, 1995

[54] COLOR IMAGE FORMING APPARATUS

[75] Inventor: Masahiro Kouzaki, Gamagori, Japan

[73] Assignee: Minolta Camera Kabushiki Kaisha, Osaka, Japan

[21] Appl. No.: 101,380

[22] Filed: Aug. 3, 1993

[30] Foreign Application Priority Data

Aug. 21, 1992 [JP] Japan .................. 4-223090

[51] Int. Cl.⁶ .............................. H04N 1/21
[52] U.S. Cl. .................... 347/232; 358/518
[58] Field of Search ............. 347/232, 115; 358/501, 358/518, 530, 515, 516, 517, 519, 520, 521

[56] References Cited

U.S. PATENT DOCUMENTS 5,237,400  8/1993  Washio et al. .............. 358/518
5,357,353 10/1994  Hirota ......................... 358/518
5,398,124  3/1995  Hirota ......................... 358/518

FOREIGN PATENT DOCUMENTS 2-268076 11/1990 Japan .

Primary Examiner—Mark J. Reinhart
Attorney, Agent, or Firm—Burns, Doane, Swecker & Mathis

[57] ABSTRACT

A color image forming apparatus having inputting means for inputting conditions of factors (lighting condition, region, color of eyes, season and date) determining the impression of a color image on an observer. The apparatus further has adjusting means for adjusting at least one of parameters (shading correction data, a reflectance-density conversion characteristic, a UCR/BP characteristic, a masking coefficient, color balance data and γ correction data) of an image processing unit to the input conditions.

9 Claims, 22 Drawing Sheets

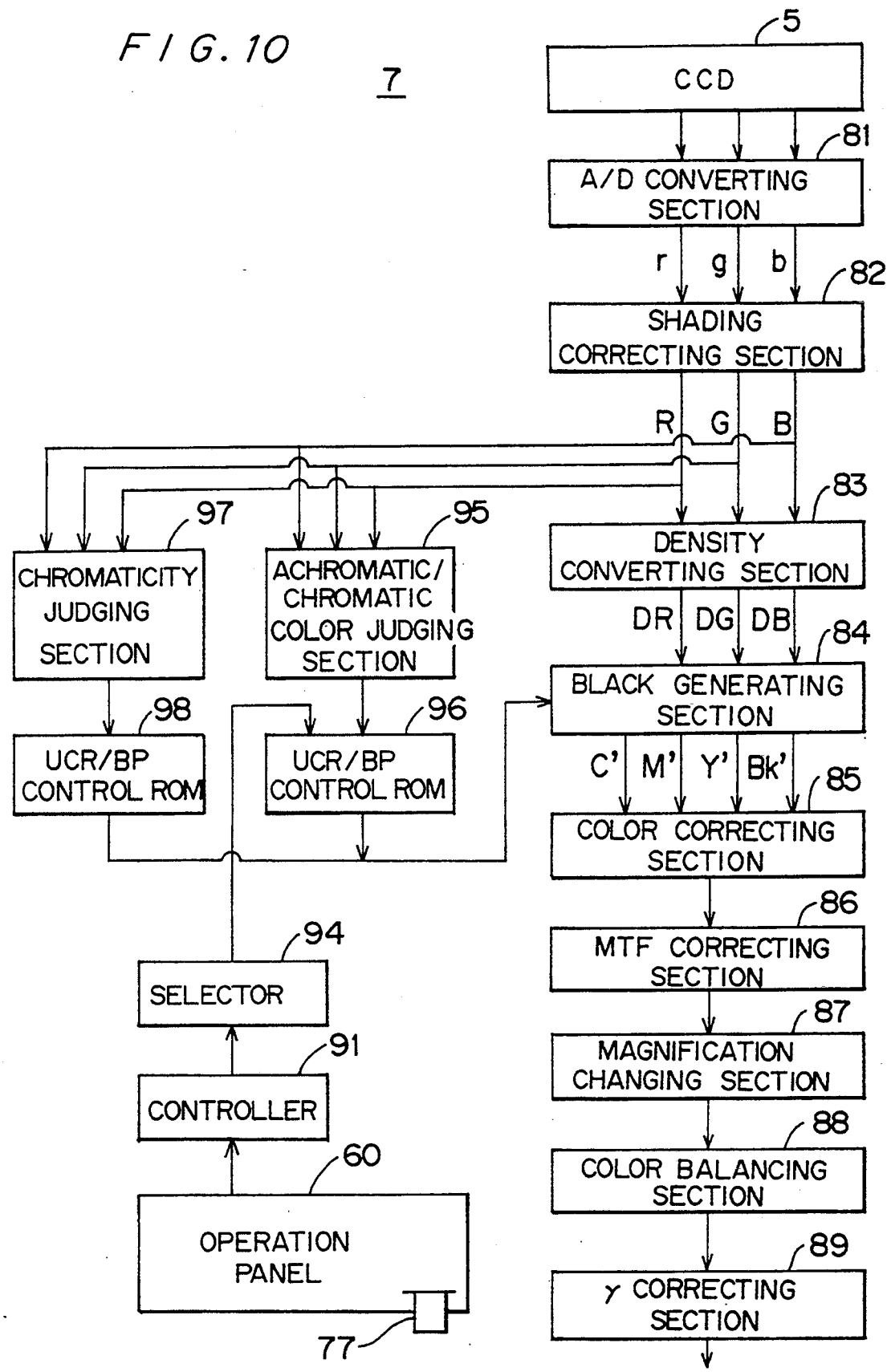

| UCR / BP | ↗ | ↘ |
|---|---|---|
| ACHROMATIC ↕ CHROMATIC | CLEAR ↕ MUDDY | DULL ↕ VIVID |

COLOR IMAGE FORMING APPARATUS

BACKGROUND OF THE INVENTION

1. Field of the Invention

The present invention relates to a color image forming apparatus which forms a full color image on a sheet by electrophotography.

2. Description of Related Art

Generally, people have different impressions of a color image depending on various factors. The observing conditions (lighting condition, season, etc.), the color of the observer's eyes, the observer's sex, the observer's age, the observer's psychological conditions, etc. may be the factors. For example, a color image which makes a favorable impression on Japanese may be reddish and unfavorable to Westerners. Also, it is probable that a color image makes a favorable impression on a person in summer and an unfavorable impression on the same person in winter.

In the art of color copying machine and color printer, the relation between the factors and the impression of a color image has been studied, and the study starts to be used practically. For example, the masking coefficient, which is one of the parameters of color correction in making print data from image data indicating the three primary colors, is set to a value which makes a favorable image to Japanese or to a value which makes a favorable image to Westerners according to the destination of the apparatus.

SUMMARY OF THE INVENTION

It is an object of the present invention to provide a color image forming apparatus which forms a favorable color image to the observer in a simple process.

In order to attain the object, a color image forming apparatus according to the present invention comprises: inputting means for inputting a condition of a factor determining the impression of a color image; and adjusting means for adjusting at least one of parameters of image processing means, which makes print data from image data indicating the three primary colors, to the condition input by the inputting means.

The factors are the lighting condition (sunlight, incandescent lamp, fluorescent lamp, etc.) of a formed image, the region where the color image forming apparatus is installed (Asia, Europe, North America, South America, Africa, etc.), the color of the observer's eyes (black, blue, brown, green, etc.) and the season or the date when the formed image is observed. The parameters of the image processing means are shading correction data, a reflectance-density conversion characteristic, a UCR/BP characteristic, a masking coefficient, color balance data and $\gamma$ correction data.

Input of a condition of the factor into a control section of the image forming apparatus is carried out by use of the inputting means provided on an operation panel of the image forming apparatus or by use of a magnetic card stored with data about the factor.

In this way, from the same image data, color images which are favorable to different observers in different conditions can be formed.

BRIEF DESCRIPTION OF THE DRAWINGS

This and other objects and features of the present invention will be apparent from the following description with reference to the accompanying drawings which show a color image forming machine according to the present invention, in which:

FIG. 10 is a block diagram of an image processing unit which makes print data suitable for the input condition by adjusting a UCR/BP characteristic to the condition;

DETAILED DESCRIPTION OF THE PREFERRED EMBODIMENTS

A preferred embodiment of the present invention is hereinafter described with reference to the accompanying drawings. In the embodiment, the present invention is applied to a digital full color copying machine provided with an image reader.

Figure 1:
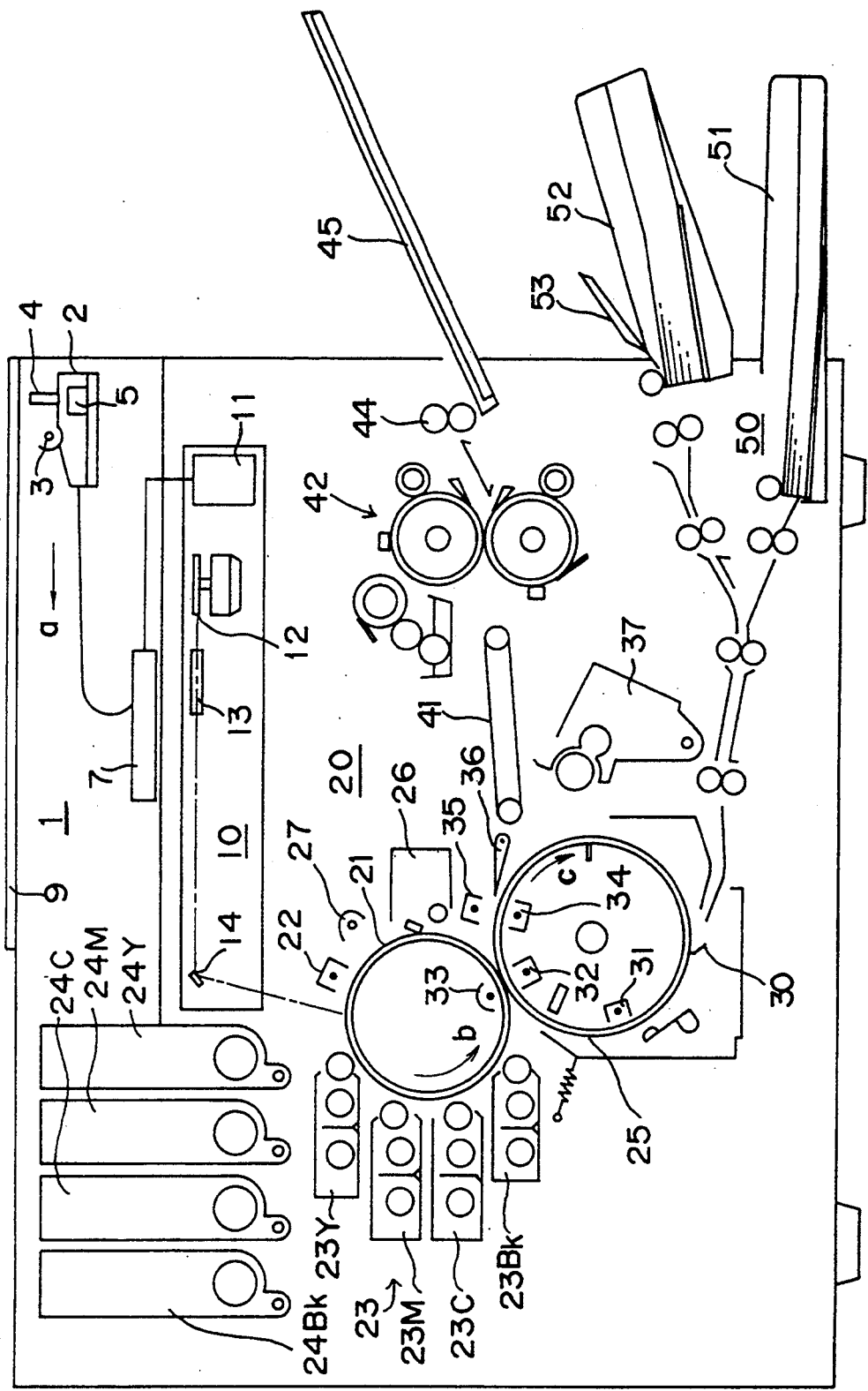
FIG. 1 is a sectional view of the color image forming machine showing its internal structure.

As shown in FIG. 1, the full color copying machine has an image reading section 1 and a laser beam optical scanning system 10 in the upper part, a full color image forming section 20 in the middle part and a sheet feeding section 50 in the lower part.

The image reading section 1 comprises an image reader unit 2 which is movable in the right and the left in FIG. 1 and an image processing unit 7 which converts image data read by the image reading unit 2 into print data used for image formation. The image reading unit 2 comprises an exposure lamp 3 for illuminating a document set on a platen glass 9, a rod lens array 4 for converging a light reflected from the document, and a contact type CCD color sensor 5 for converting the light into an electric signal. The image reading unit 2 stands by at a home position which is in the right in FIG. 1 and scans an image of the document while moving in a direction indicated with arrow a. During the scanning, the image reading unit 2 reads the image as image data of the three primary colors, R (red), G (green) and B (blue). The image processing unit 7 converts the image data of R, G and B into print data of four colors, C (cyan), M (magenta), Y (yellow) and Bk (black).

The laser beam optical scanning system 10 comprises a laser control unit 11, a laser source (not shown), a polygonal mirror 12, an $f\theta$ lens 13, a mirror 14, etc. The laser source emits a laser beam in accordance with the print data of each of the colors C, M, Y and Bk transmitted from the image processing unit 7. The laser beam is deflected in a plane by the polygonal mirror 12 which rotates at a constant speed. Then, the laser beam passes through the $f\theta$ lens 13 and the mirror 14 and is imaged on a photosensitive drum 21 which rotates in a direction indicated with arrow b. Thus, an electrostatic latent image is formed on the photosensitive drum 21.

The main components of the full color image forming section 20 are the photosensitive drum 21 and a transfer drum 25. Around the photosensitive drum 21, there are provided an electric charger 22, a developing unit 23, a transfer drum 25, a residual toner cleaner 26 and an eraser lamp 27 for erasing residual charge. In the developing unit 23, four developing devices 23Y, 23M, 23C and 23Bk which use a developer containing yellow toner, a developer containing magenta toner, a developer containing cyan toner and a developer containing black toner respectively are arranged one upon another. Each time an electrostatic latent image in accordance with the print data of each color is formed on the photosensitive drum 21, the corresponding developing device 23Y, 23M, 23C or 23Bk operates to develop the latent image. The yellow toner, the magenta toner, the cyan toner and the black toner are contained in hoppers 24Y, 24M, 24C and 24Bk respectively, and when a toner replenishment signal is generated from toner density detecting means (not shown), the required toner is replenished from the corresponding hopper 24Y, 24M, 24C or 24Bk to the corresponding developing device 23Y, 23M, 23C or 23Bk.

The transfer drum 25 is driven to rotate in a direction indicated with arrow c in synchronization with the photosensitive drum 21. Inside and outside of the transfer drum 25, there are provided a chuck claw 30 for holding the leading edge of a sheet, a sucking charger 31 for sucking the sheet onto the surface of the transfer drum 25, transfer chargers 32 and 33 for transferring toner onto the sheet, erasing chargers 34 and 35 for erasing charge, a separation pawl 36 for separating the sheet from the transfer drum 25 and a residual toner cleaner 37.

In order to form a full color image, toner images of Y, M, C and Bk are formed on the photosensitive drum 21 and transferred onto a sheet which winds around the transfer drum 25 one by one. When all the four images are transferred onto the sheet and combined thereon, the separation pawl 36 operates to separate the sheet from the transfer drum 25. Also, the cleaner 37 operates to remove residual toner on the transfer drum 25.

The sheet feeding section 50 has automatic feed trays 51 and 52 which contain sheets of specified sizes respectively. Sheets are fed one by one from the tray 51 or 52 which is selected by the operator, and each sheet fed from the tray 51 or 52 is transported to the transfer drum 25 by a number of rollers. Additionally, the copying machine is provided with a manual feed tray 53 such that the operator can manually feed a sheet to the image forming section 20.

The sheet separated from the transfer drum 25 is fed to a fixing device 42, where the toner is fixed on the sheet, via a conveyer belt 41. Thereafter, the sheet is ejected onto an ejected-sheet tray 45 by an ejection roller pair 44.

Figure 2:
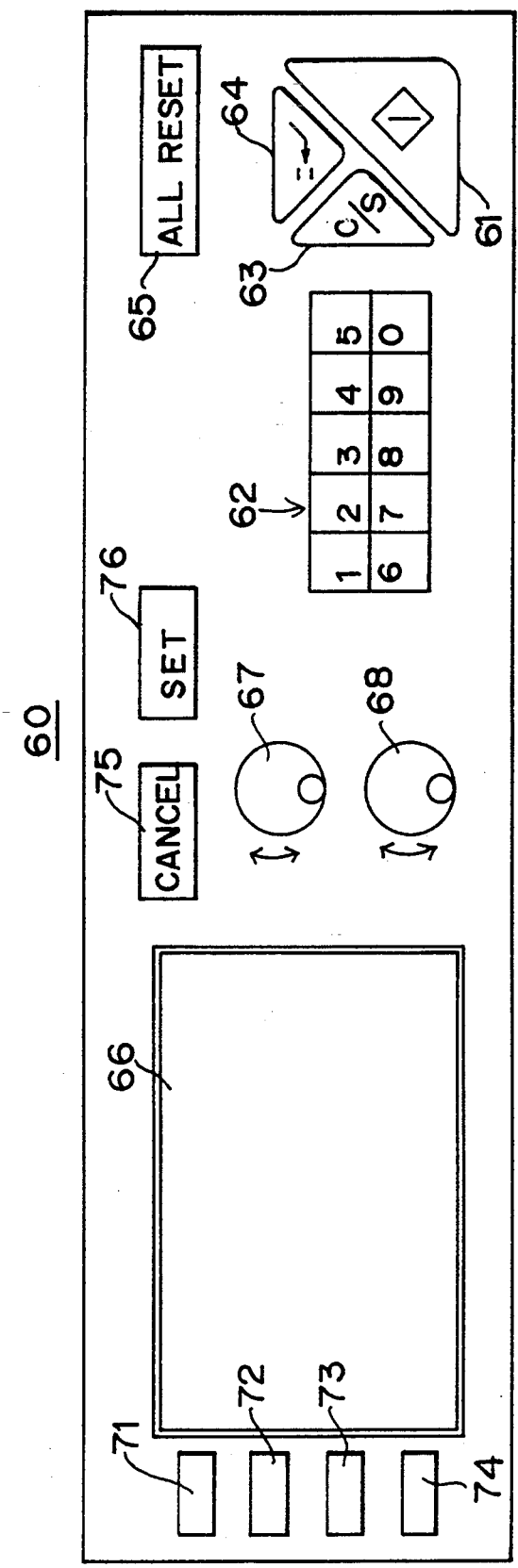
FIG. 2 is a plan view of an operation panel.

Next, referring to FIG. 2, an operation panel 60 of the full color copying machine is described.

The operation panel 60 has the following input means and indication means:

a copying start key 61 for starting a copying operation;

a ten-key 62 for setting the number of copies and the magnification;

a clear/stop key 63 for clearing the set number and stopping a multiple copying operation;

an interrupt key 64 for discontinuing a multiple copying operation to handle another copying operation;

an all reset key 65 for resetting all the input to return the copying conditions to initial states;

a liquid crystal display 66 for displaying pictures shown in FIGS. 3, 4, 20, 21 and 23 to set copying conditions;

dials 67 and 68 for making a selection between optional items displayed on the liquid crystal display 66, each of the dials 67 and 68 incorporating a rotary encoder;

function keys 71, 72, 73 and 74 for changing pictures on the liquid crystal display 66;

a cancel key 75 for canceling the selection made on the liquid crystal display 66; and a set key 76 for confirming the selection made on the liquid crystal display 66.

Figure 3:
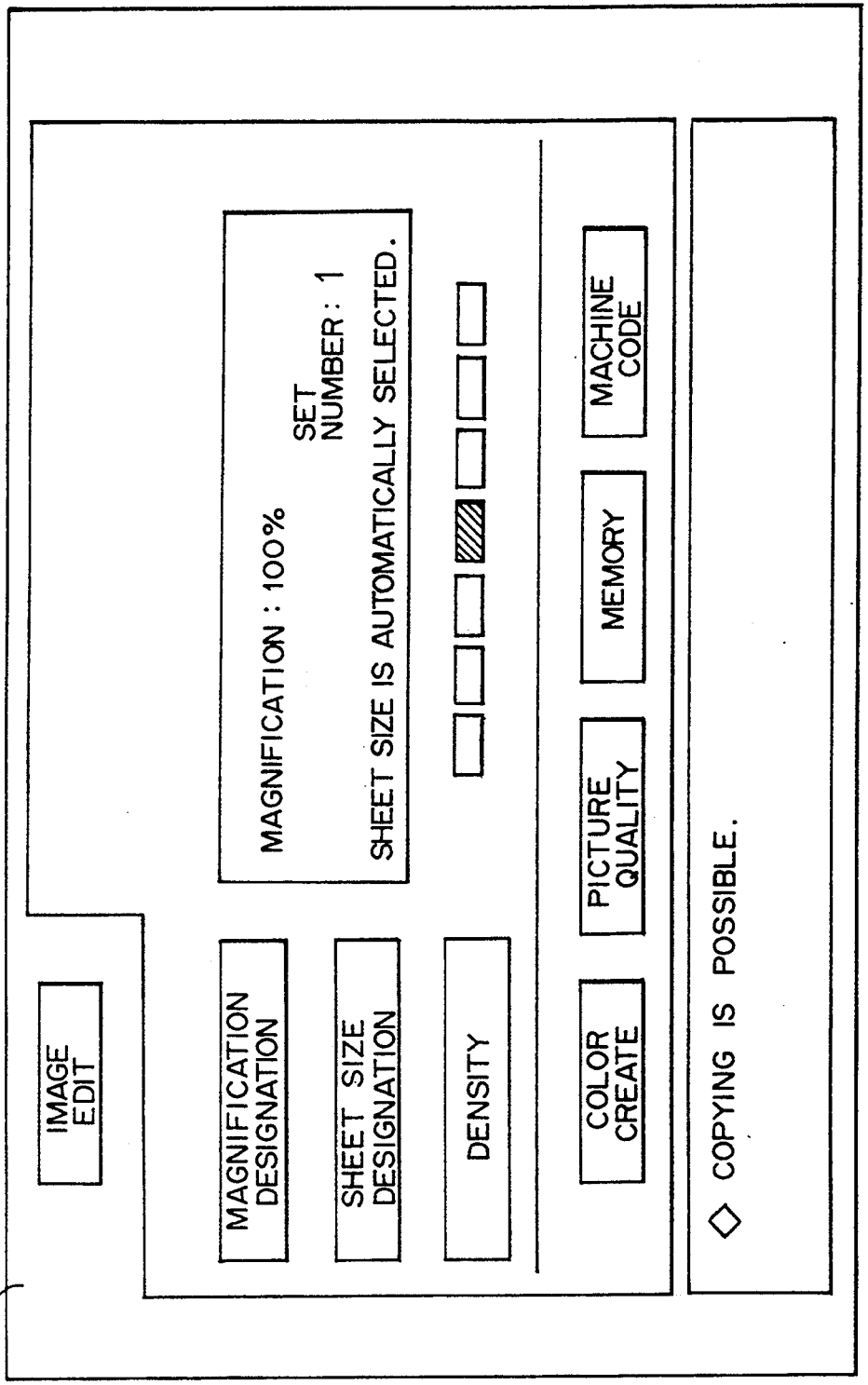
FIG. 3 is a plan view of a picture which initially appears on a liquid crystal display of the operation panel.

The liquid crystal display 66 displays a picture of FIG. 3 in the initial state. In this state, the magnification, the sheet size, the image density, etc. can be set.

The function keys 71 through 74 are used for setting of copying conditions to make a color image which will make a favorable impression on the image observer.

Figure 4:
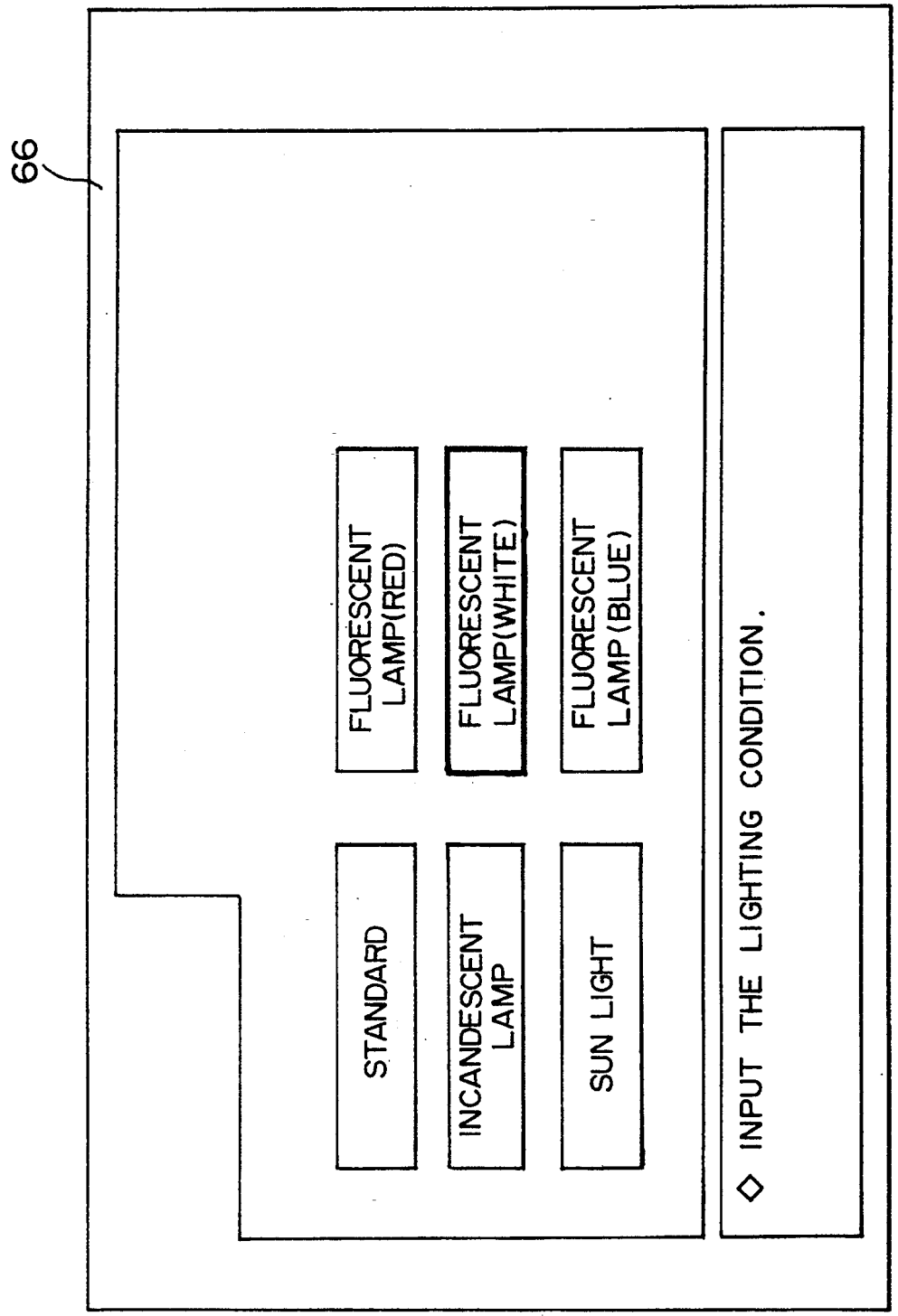
FIG. 4 is a plan view of a picture which appears on the liquid crystal display for input of the lighting condition.
Figure 5:
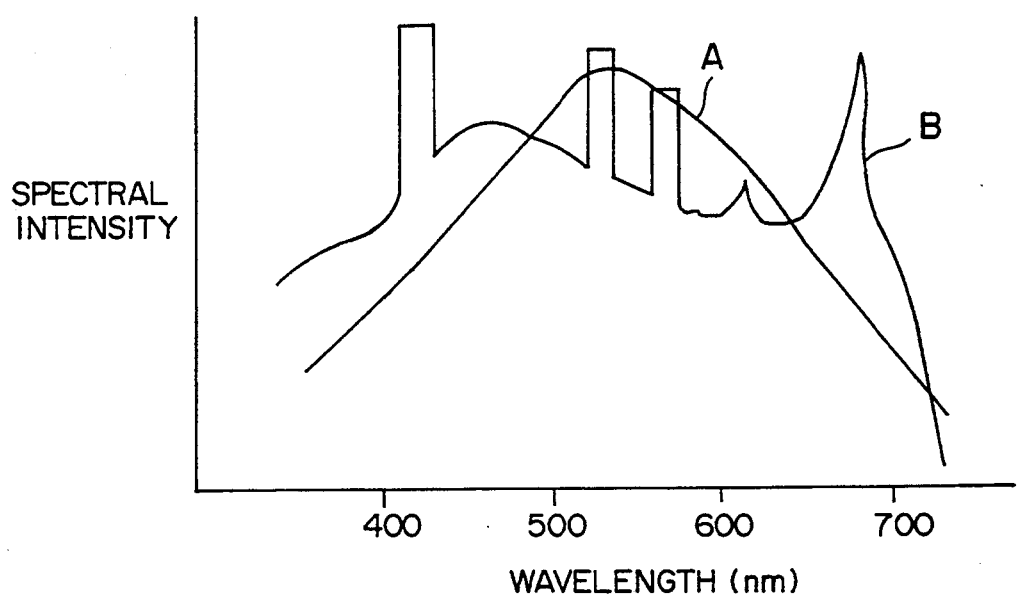
FIG. 5 is a graph which shows the spectral intensity characteristic of the sunlight and the spectral intensity characteristic of a fluorescent light (white)

When the function key 71 is turned on, the liquid crystal display 66 displays a picture of FIG. 4. In this state, the lighting condition in which the color image is to be observed can be set. On the picture, six items "standard", "incandescent lamp", "sunlight", "fluorescent lamp (red)", "fluorescent lamp (white)" and "fluorescent lamp (blue)" are indicated, and by use of the dials 67 and 68, the operator can select one of these. FIG. 4 shows a state that "fluorescent lamp (white)" is selected. In the initial state, "standard" is selected, and the image processing unit 7 makes print data to make a color image which will makes a favorable impression under white light. The light source which illuminates a color image influences the color temperature and the spectral distribution, and the same color image makes different impressions on an observer in different lighting conditions. FIG. 5 shows the spectral intensity characteristic of the sunlight (curve A) and that of a fluorescent lamp (white) (curve B). Likewise, the other kinds of lights each have a peculiar spectral intensity characteristic, and the image processing unit 7 adjusts image data to the selected lighting condition.

Figure 6:
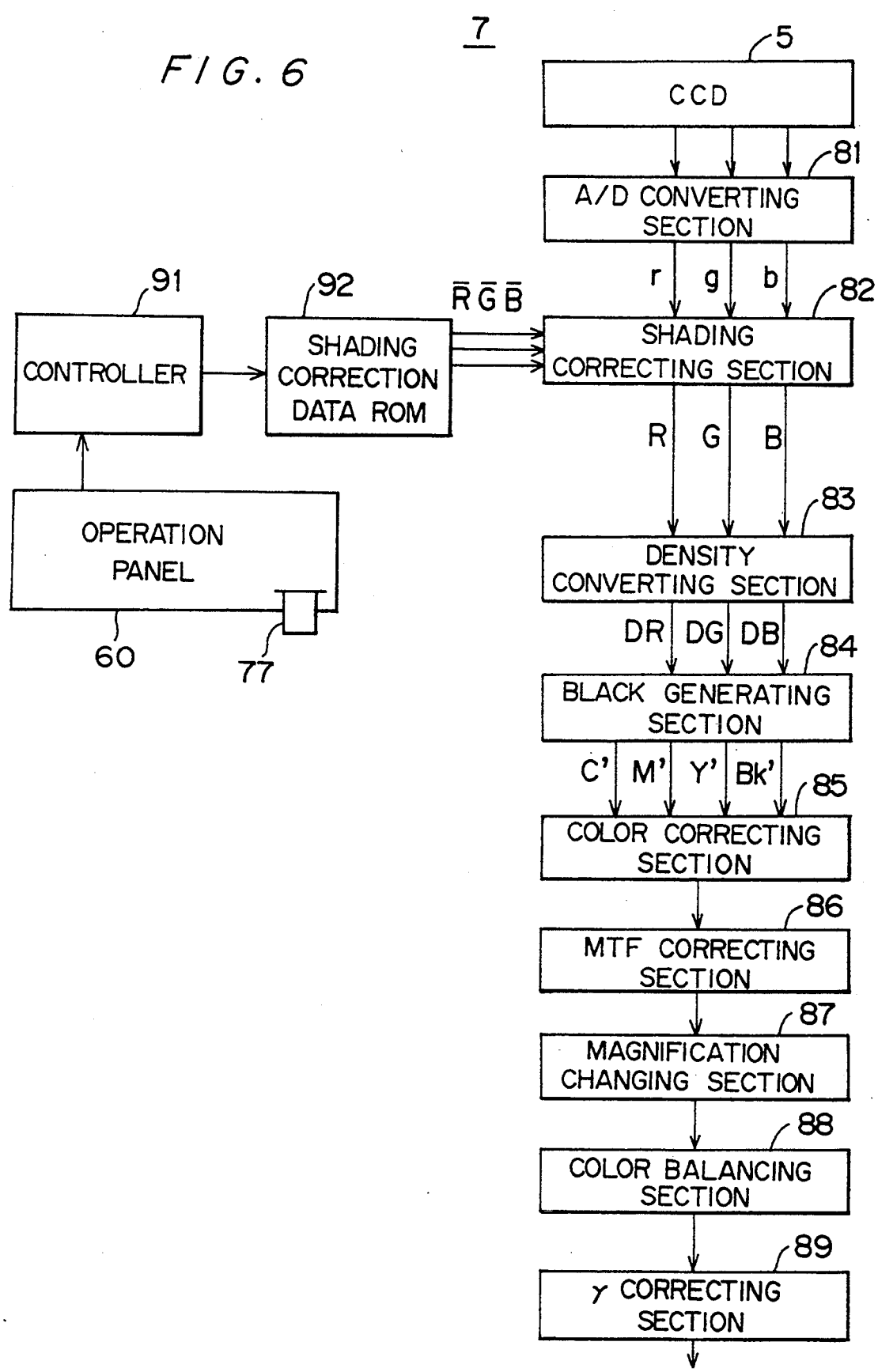
FIG. 6 is a block diagram of an image processing unit which makes print data suitable for the input condition by adjusting shading correction data to the condition.

Referring to FIG. 6, the image processing unit 7 is described in more detail. The image processing unit 7 comprises an A/D converting section 81 which converts image data sent from the CCD color sensor 5, a shading correcting section 82, a density converting section 83, a black generating section 84, a color correcting section 85, an MTF correcting section 86, a magnification changing section 87, a color balancing section 88 and a γ correcting section 89. The image processing unit 7 has a ROM 92 which is stored with shading correction data including adjustment data which are used to adjust image data to the lighting condition. The ROM 92 is controlled by a controller 91 which is driven in accordance with a signal sent from the operation panel 60. When the operator sets the lighting condition with the picture of FIG. 4 in the above-described manner, the controller 91 receives a signal from the operation panel 60 and commands the ROM 92 to send shading correction data suitable for the lighting condition to the shading correcting section 82. Eight-bit data (r, g, b) quantized by the A/D converting section 81 are provided with shading correction data ($\overline{R}, \overline{G}, \overline{B}$), and data (R, G, B) are made as follows:

$$R = r \times (\overline{R}/M)$$

$$G = g \times (\overline{G}/M)$$

$$B = b \times (\overline{B}/M)$$

M: integer

Figure 7A:
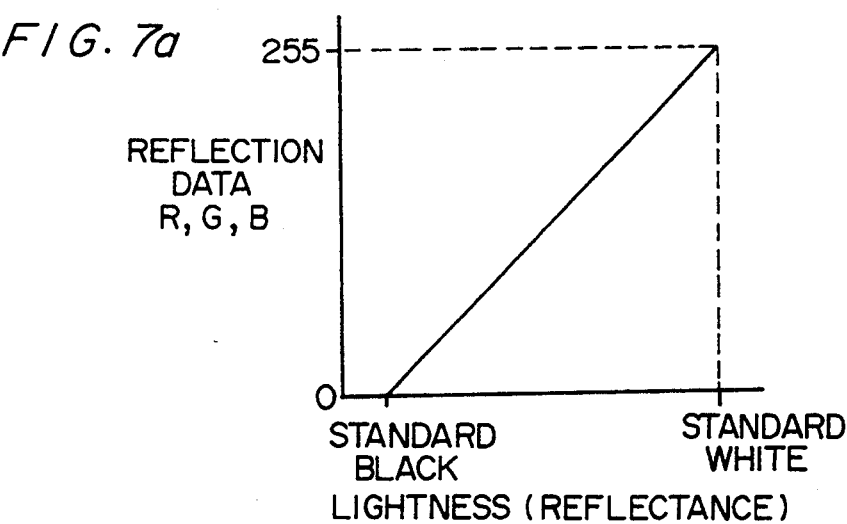
FIGS. 7a, 7b and 7c are graphs showing the shading correction data.
Figure 7B:
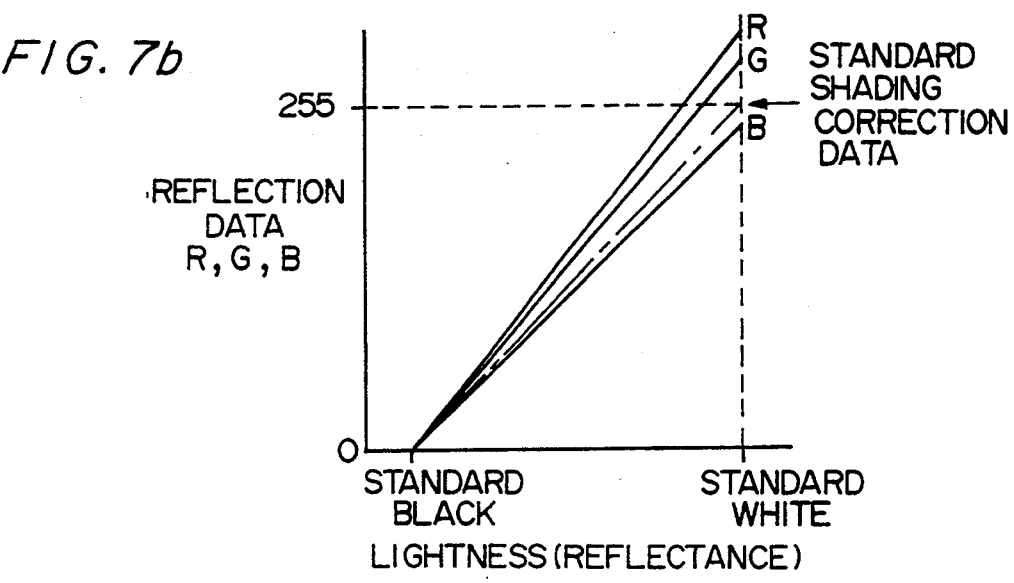
Figure 7C:
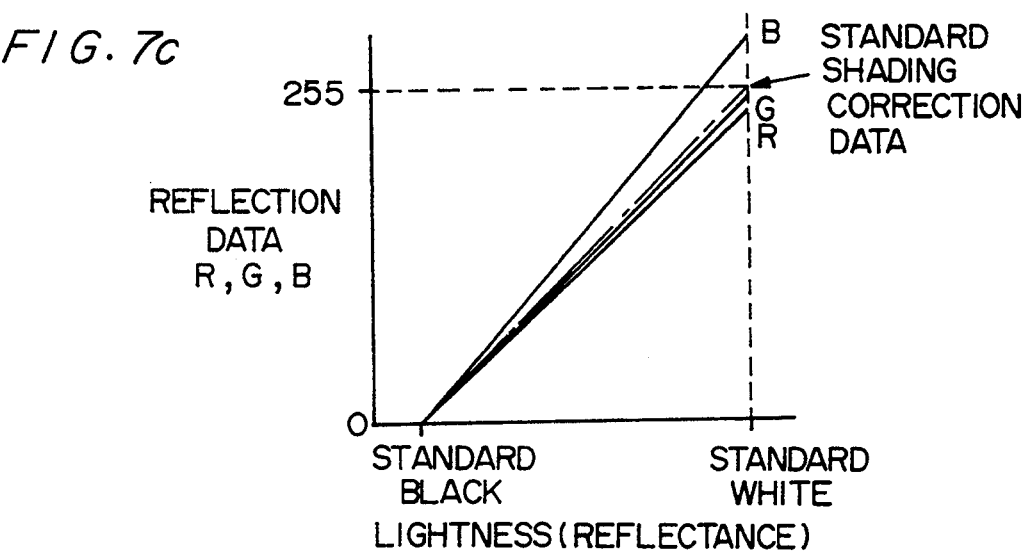

FIG. 7a shows shading correction data in the standard lighting condition. FIG. 7b shows shading correction data to enhance yellow, and these data are used when "fluorescent lamp (blue)" is selected. FIG. 7c shows shading correction data to enhance blue, and these data are used when "incandescent lamp" is selected. These and other correction data suitable for the respective lighting conditions are stored in the ROM 92, and the data are sent to the shading correcting section 82 in accordance with the input with the picture of FIG. 4.

Figure 8:
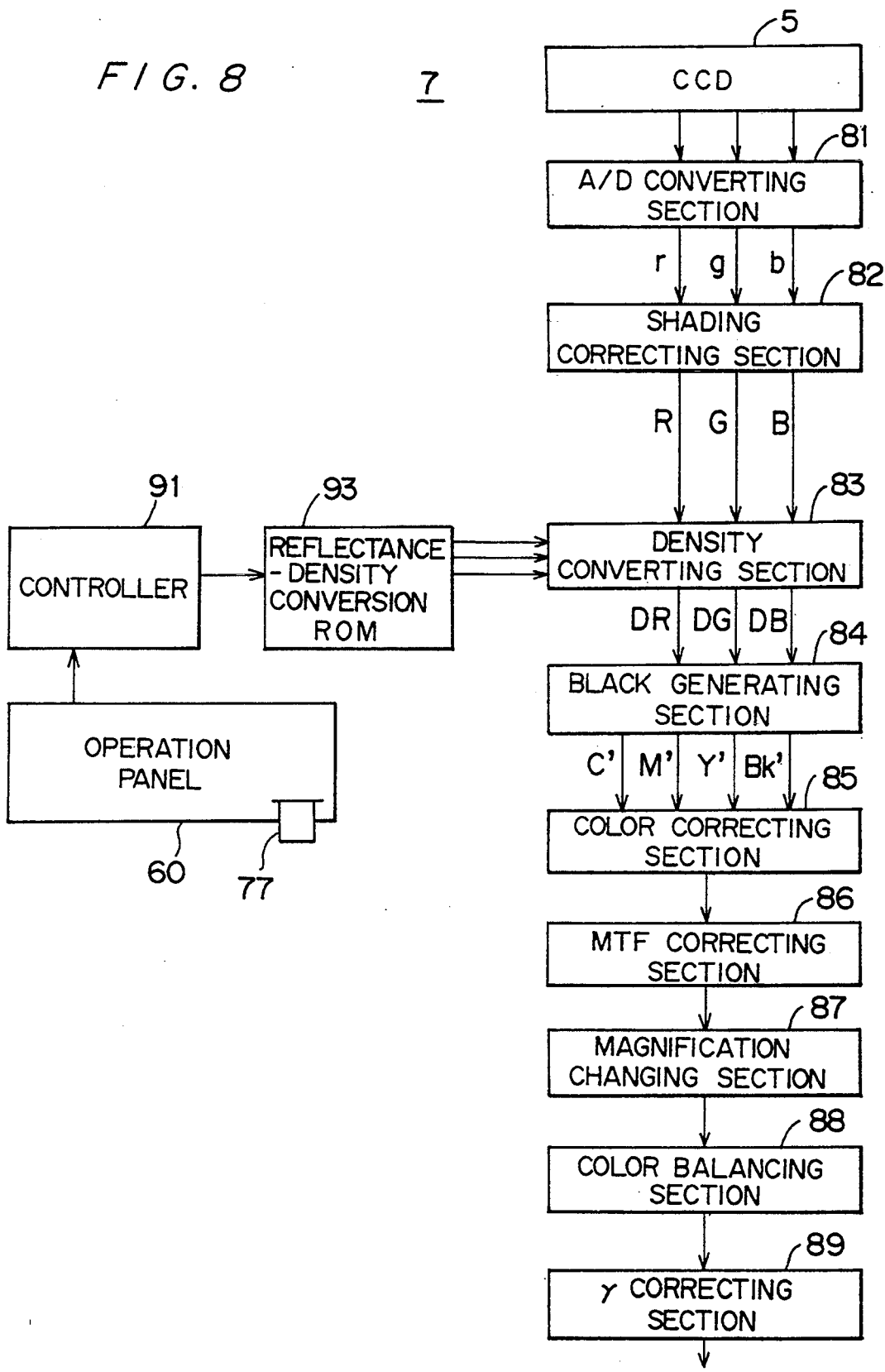
FIG. 8 is a block diagram of an image processing unit which makes print data suitable for the input condition by adjusting reflectance-density conversion data to the condition.
Figure 9A:
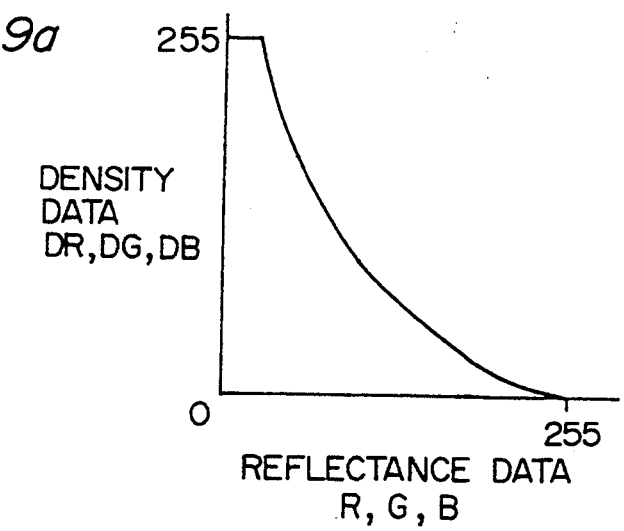
FIGS. 9a, 9b and 9c are graphs showing the reflectance-density conversion data.
Figure 9B:
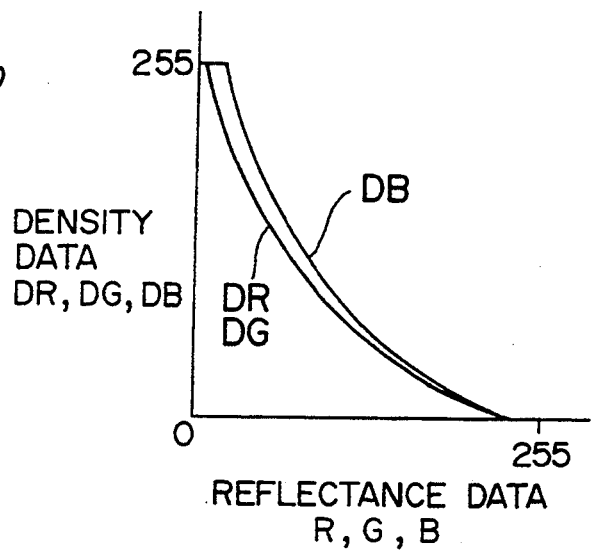
Figure 9C:
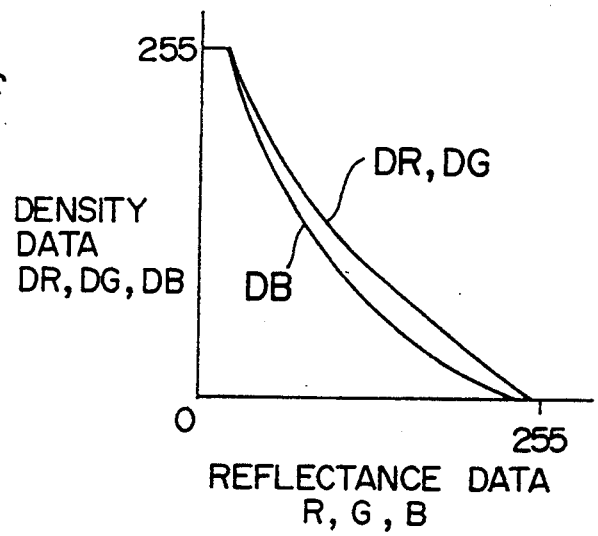

Also, as shown in FIG. 8, the adjustment of image data to the lighting condition may be made in the density converting section 83. In this case, a reflectance-density conversion ROM 93 is stored with reflectance-density conversion data including adjustment data which are used to adjust image data to the lighting condition, and the ROM 93 sends reflectance-density conversion data suitable for the lighting condition to the density converting section 83 under the control of the controller 91. FIG. 9a shows reflectance-density conversion data in the standard lighting condition, and these data are indicated by a monotonous decreasing curve substantially expressed by Y = −logX. FIG. 9b shows reflectance-density conversion data to enhance yellow, and these data are used when "fluorescent lamp (blue)" is selected. FIG. 9c shows reflectance-density conversion data to enhance blue, and these data are used when "incandescent lamp" is selected. These and other reflectance-density conversion data suitable for the respective lighting conditions are stored in the ROM 93, and the data are sent to the density conversion section 83 in accordance with the input with the picture of FIG. 4.

Figures 11, 12:
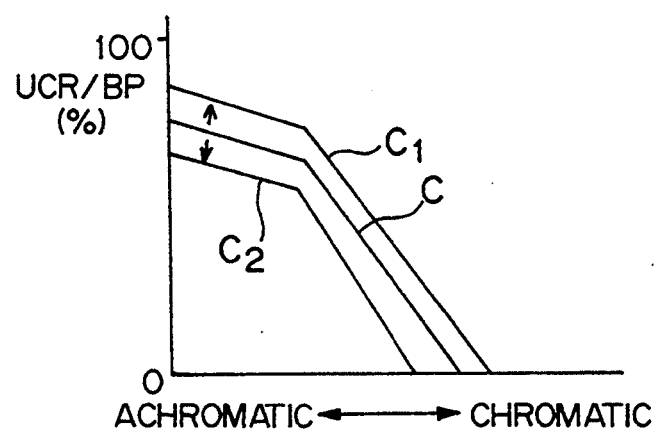
FIG. 11 is a chart showing the relation between the ratio UCR/BP and the chromaticity.
FIG. 12 is a graph showing UCR/BP correction data.

Further, as shown in FIG. 10, the adjustment of image data to the lighting condition may be made in the black generating section 84. Generally, in forming a full color image from four colors of yellow (Y), magenta (M), cyan (C) and black (Bk), a high density region is reproduced by using Bk as well as Y, M and C. Originally, any color can be made from three colors of Y, M and C. However, in order to improve the reproductivity of a high density region, the amounts of Y toner, M toner and C toner are reduced by under color removal (UCR) and Bk toner is added. The ratio of the total amount of reduced Y, M and C toners (UCR) to the amount of added Bk toner (BP) influences the chromaticity of the reproduced image as shown in FIG. 11. In making the adjustment in the black generating section 84, the relation between the ratio of UCR to BP and the chromaticity of the reproduced image as shown by FIG. 11 must be considered. In a judging section 95, judgment of an achromatic color or a chromatic color is made from the data (R, G, B) obtained after the shading correction, and the chromaticity is corrected by UCR/BP correction data stored in a UCR/BP control ROM 96. The UCR/BP correction data are practically curves $C_1$, $C_2$ and other curves converted from a standard UCR/BP (%) characteristic curve C. With a correction in accordance with the curve $C_1$, the reproduced color shifts to a chromatic side, and with a correction in accordance with the curve $C_2$, the reproduced color shifts to an achromatic side.

Figure 13A:
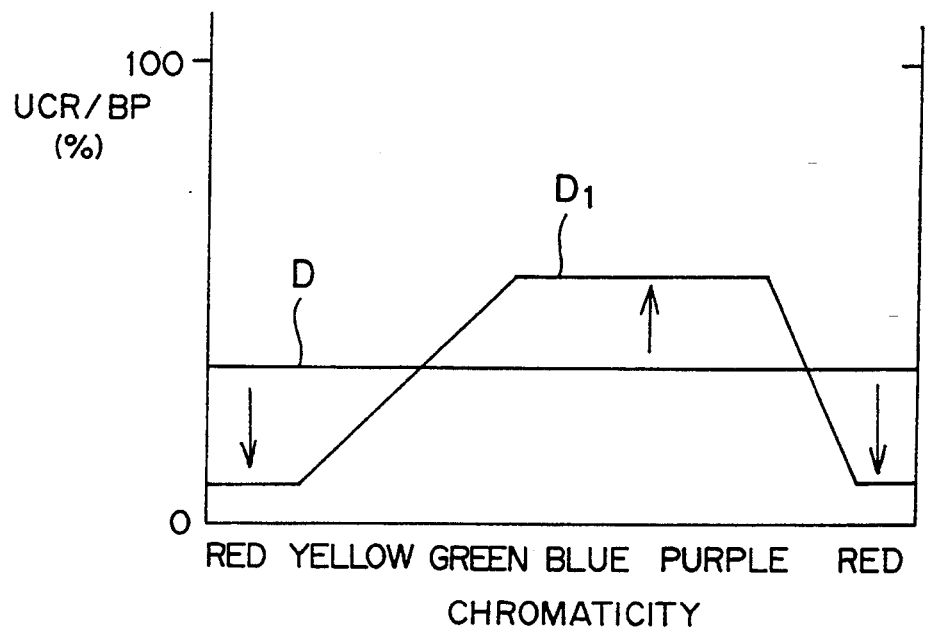
FIGS. 13a and 13b are graphs showing other ways of adjusting the UCR/BP characteristic.
Figure 13B:
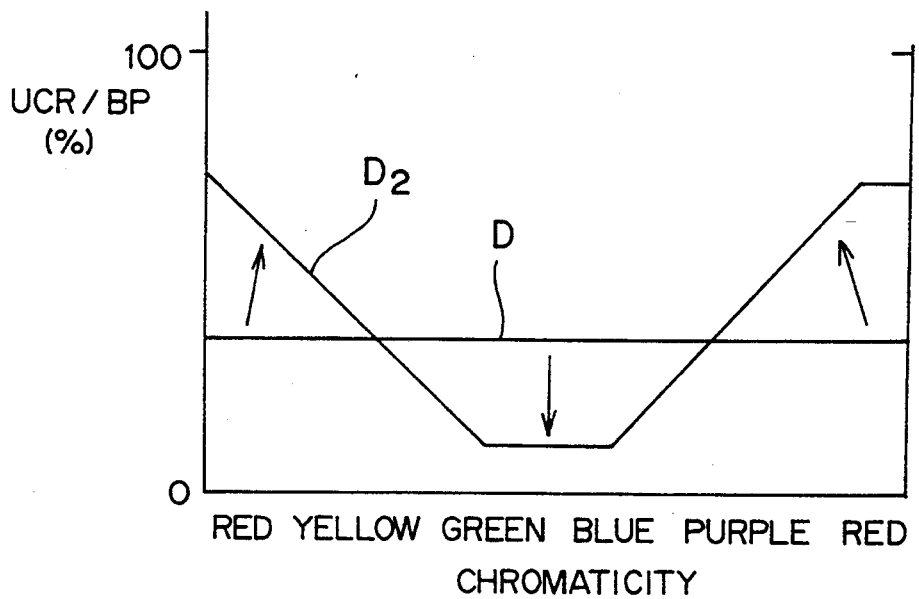

Further, in this embodiment, another judging section 97 is provided. The judging section 97 judges the chromaticity from the data (R, G, B) obtained after the shading correction, and in the black generating section 84, the chromaticity is corrected by UCR/BP correction data stored in a UCR/BP control ROM 98. The correction data stored in the ROM 98 are practically a curve $D_1$ (see FIG. 13a) to make reddish colors clearer than a standard characteristic curve D, a curve $D_2$ (see FIG. 13b) to make greenish and bluish colors clearer, and other characteristic curves.

The UCR/BP control ROMs 96 and 98 are also stored with adjustment data which adjust the UCR/BP characteristic curves to the respective lighting conditions. The ROM 96 and the ROM 98 are switched for use by a selector 94 which is controlled by the controller 91.

Figure 14:
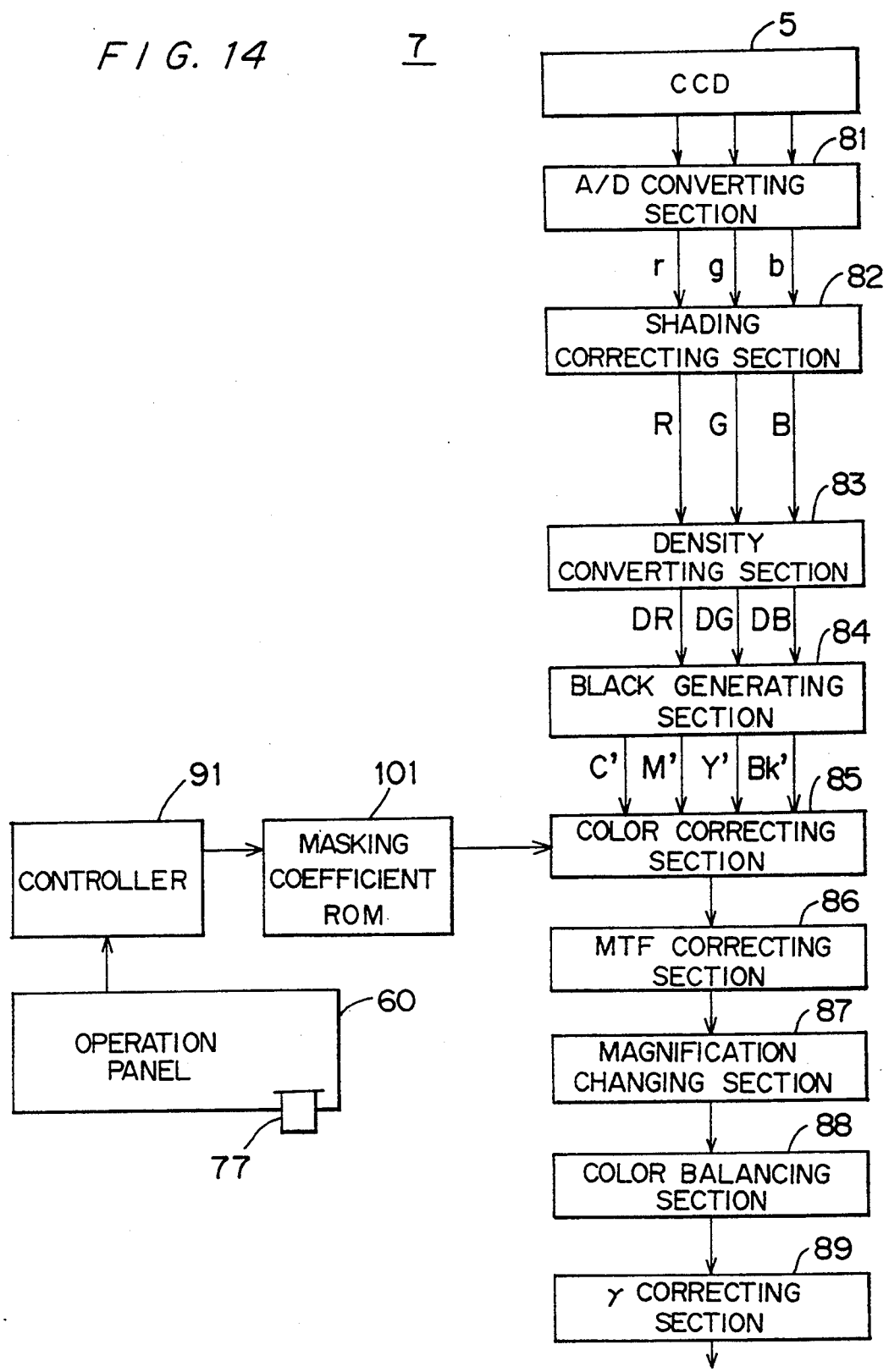
FIG. 14 is a block diagram of an image processing unit which makes print data suitable for the input condition by adjusting a masking coefficient to the condition.

FIG. 14 shows a case in which the adjustment of image data to the lighting condition is made in the color correcting section 85. A masking operation is carried out here. Data of a linear image are processed as follows:

$$\begin{pmatrix} C \\ M \\ Y \end{pmatrix} = \begin{pmatrix} A1 A2 A3 \\ A4 A5 A6 \\ A7 A8 A9 \end{pmatrix} \begin{pmatrix} C' - \alpha \operatorname{MIN}(C',M',Y') \\ M' - \alpha \operatorname{MIN}(C',M',Y') \\ Y' - \alpha \operatorname{MIN}(C',M',Y') \end{pmatrix}$$

Coefficients of matrices 3×3 n (n: integer) are set such that the color difference between an original image and a reproduced image will be minimized in certain conditions. The coefficients are stored in a masking coefficient ROM 101. The ROM 101 is controlled by the controller 91, and in accordance with the lighting condition input on the operation panel 60, a set of coefficients suitable for the lighting condition is sent to the color correcting section 85.

Figure 15:
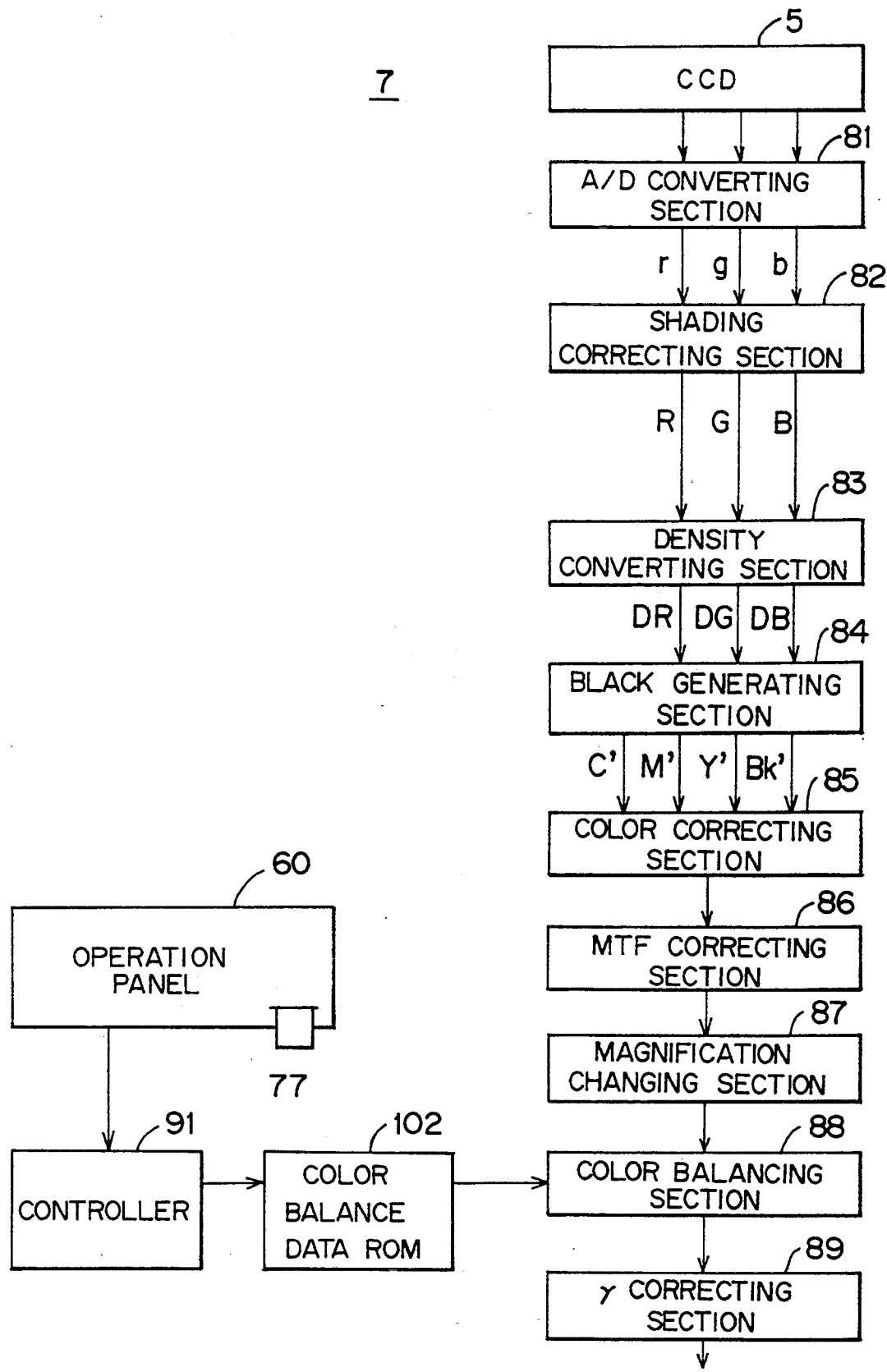
FIG. 15 is a block diagram of an image processing unit which makes print data suitable for the input condition by adjusting color balance data to the condition.
Figure 16:
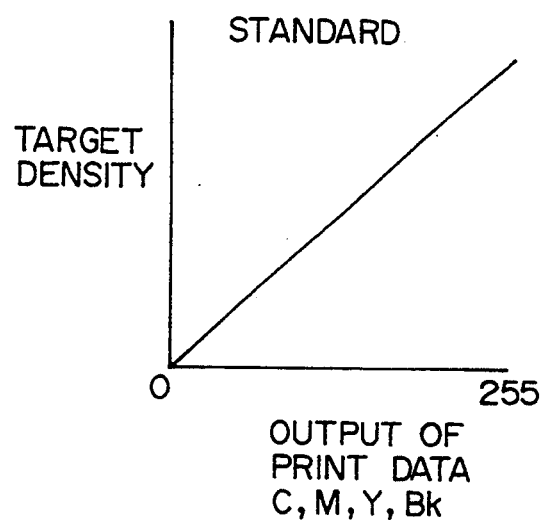
FIG. 16 is a graph showing the relation between the amount of output print data and a target density in a standard condition.
Figure 17A:
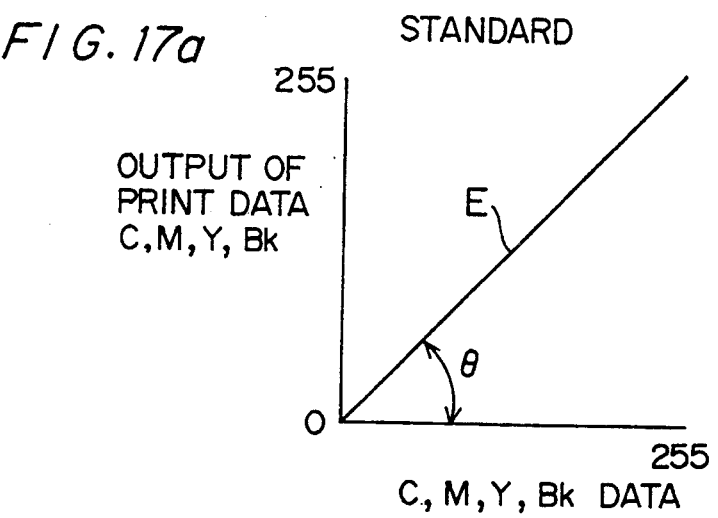
FIGS. 17a, 17b and 17c are graphs showing the color balance correction data.
Figure 17B:
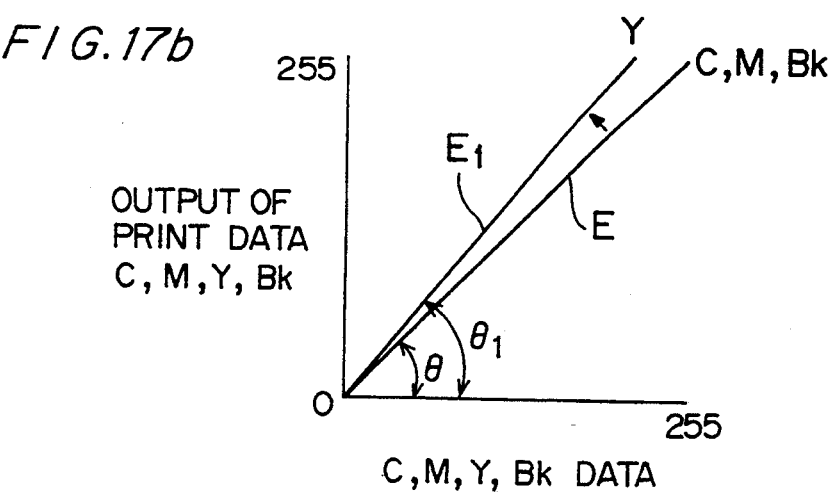
Figure 17C:
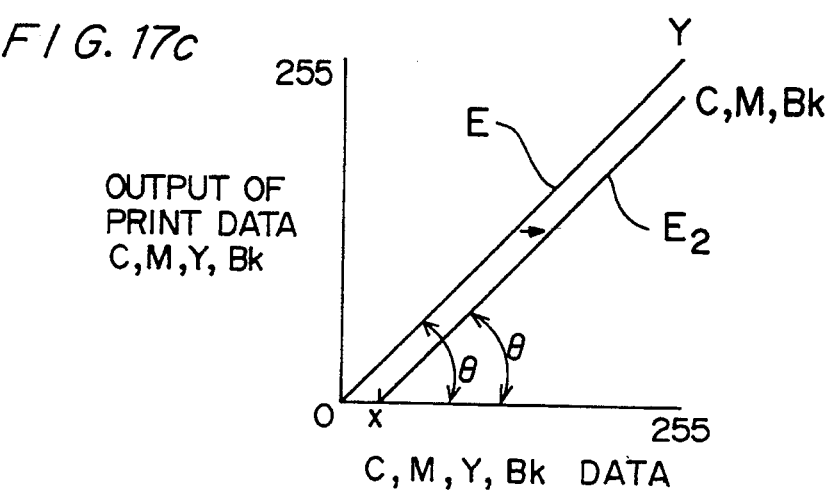

FIG. 15 shows a case in which the adjustment of image data to the lighting condition is made in the color balancing section 88. Regarding the tone, the color balancing section 88 reverses the image data of the four colors C, M, Y and Bk such that the tone characteristic will be expressed by a straight line as shown in FIG. 16, and the reversed data are sent from the image processing unit 7 to the laser beam optical scanning system 10 as print data. With respect to each of the colors C, M, Y and Bk, the reversal of the tone, in the standard condition, is carried out such that the tone of the original image and that of the reproduced image will be at a ratio of 1:1 as expressed by a line E at an angle of $\theta$ shown in FIG. 17a. A change in color balance is made as follows. For example, if the reversal of the tone of yellow is carried out according to a line $E_1$ at an angle of $\theta_1$ shown in FIG. 17b, yellow will be enhanced on the reproduced image. Also, if the reversal of the tone of yellow is carried out at the ratio of 1:1 and the reversal of the other colors C, M and Bk is carried out with an offset x as expressed by a line $E_2$ in FIG. 17c, yellow will be enhanced on the reproduced image. It is possible to change the color balance in any desirable way by combining these two methods.

Color balance correction data suitable for the respective lighting conditions are stored in a color balance data ROM 102. The ROM 102 is controlled by the controller 91 and sends correction data suitable for the lighting condition input on the operation panel 60 to the color balancing section 88.

Figure 18:
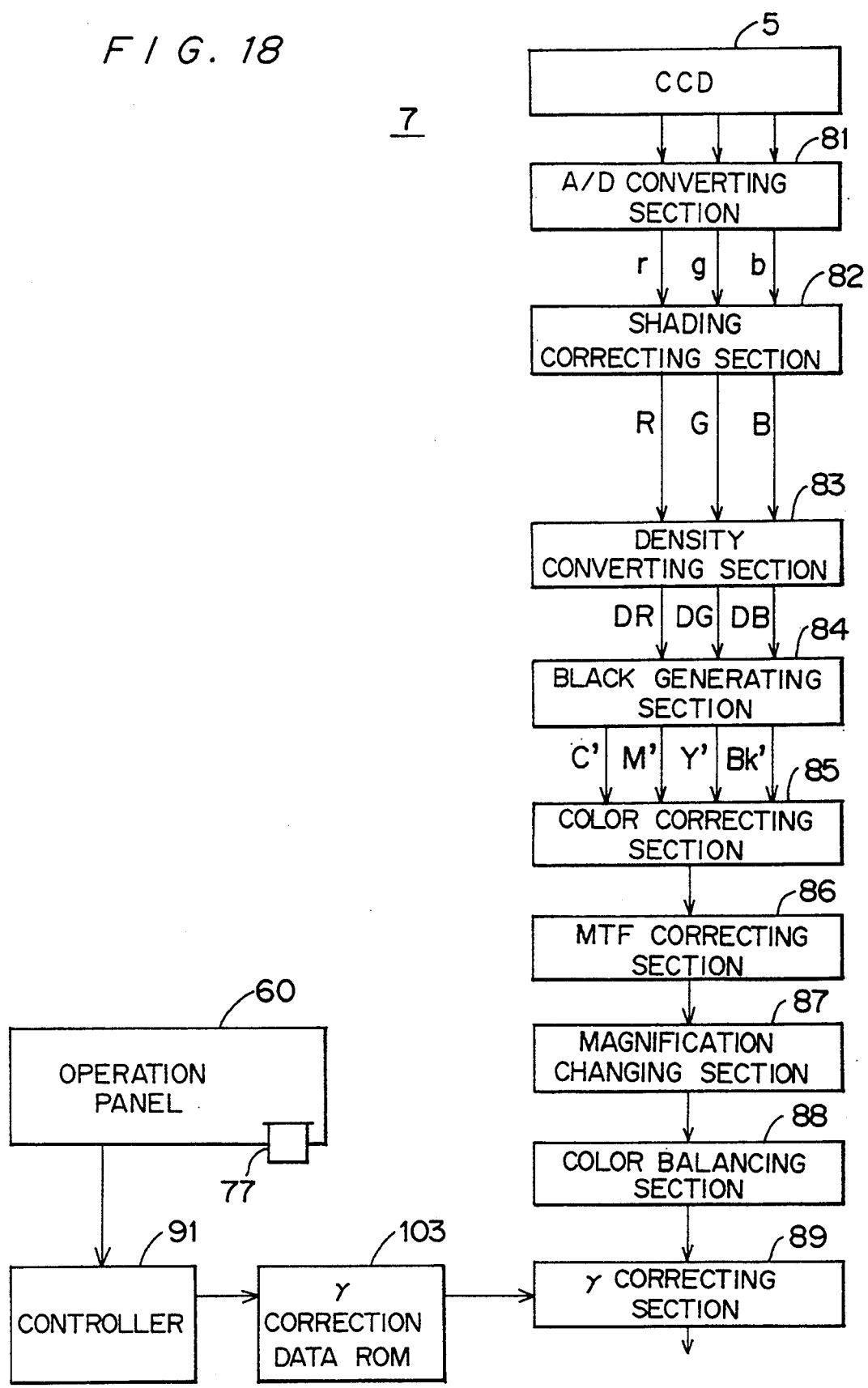
FIG. 18 is a block diagram of an image processing unit which makes print data suitable for the input condition by adjusting $\gamma$ correction data to the condition.
Figure 19A:
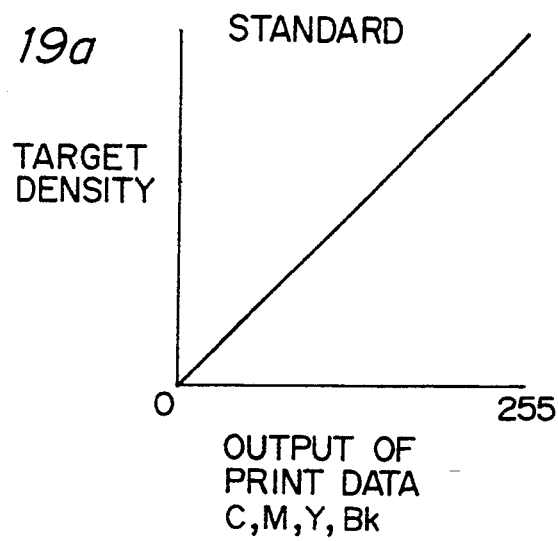
FIGS. 19a, 19b and 19c are graphs showing the $\gamma$ correction data.
Figure 19B:
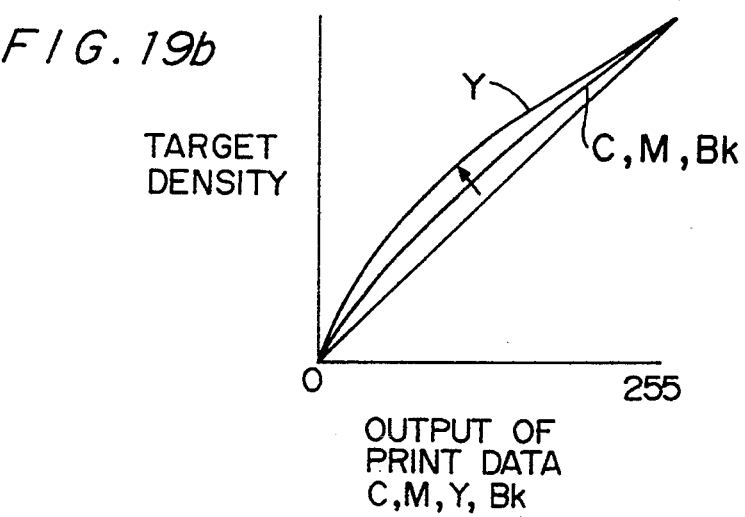
Figure 19C:
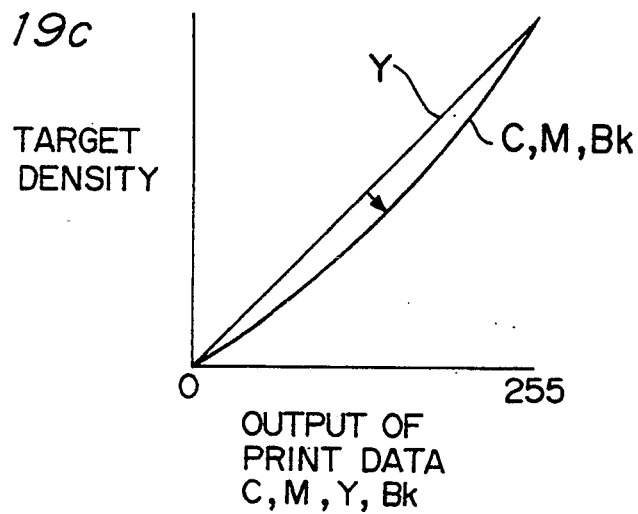

FIG. 18 shows a case in which the adjustment of image data to the lighting condition is made in the $\gamma$ correcting section 89. $\gamma$ correction is to change the relation between the amount of an output of print data C, M, Y or Bk and a target density (tone characteristic). FIG. 19a shows $\gamma$ correction data in the standard condition. With the data, the density is proportional to the amount of an output of print data. Both FIGS. 19b and FIG. 19c show $\gamma$ correction data to enhance yellow. According to FIG. 19b, with the same amount of output print data, yellow is reproduced more densely than the other colors C, M and Bk. According to FIG. 19c, the colors C, M and Bk are reproduced more thinly than in the standard condition, while yellow is reproduced with the same density as in the standard condition.

$\gamma$ correction data suitable for the respective lighting conditions are stored in a $\gamma$ correction data ROM 103. The ROM 103 is controlled by the controller 91 and sends $\gamma$ correction data suitable for the lighting condition input on the operation panel 60 to the $\gamma$ correcting section 89.

In this way, in order to make a favorable image, one of the parameters (shading correction data, reflectance-density conversion characteristic, UCR/BP characteristic, masking coefficient, color balance data and $\gamma$ correction data) of the image processing unit 7 is adjusted to the lighting condition of a reproduced image which is set with the picture of FIG. 4. Further, two or more of the parameters may be changed for the same purpose.

Figure 20:
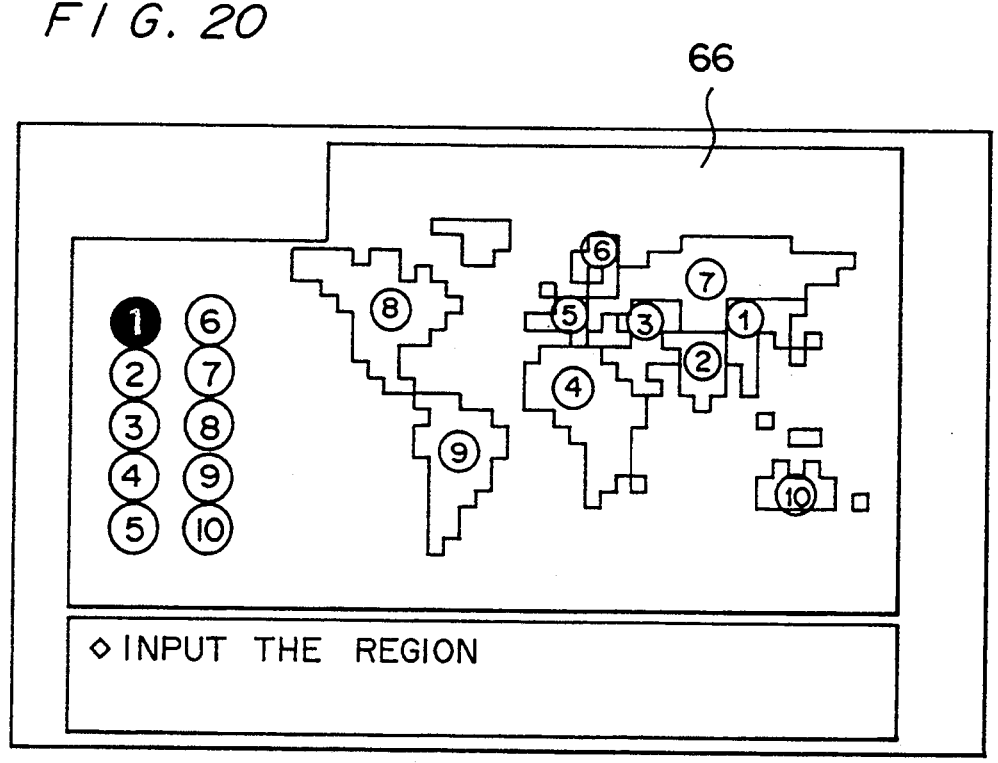
FIG. 20 is a plan view of a picture which appears on the liquid crystal display for input of the region.

Additionally, by using the function key 72, the region where the color copying machine is installed can be input, and one of the parameters is changed in accordance with the input data. When the function key 72 is turned on, a picture of FIG. 20 appears on the display 66. The world is divided into ten regions, and the regions are provided with numerals 1 through 10. By use of the dials 67 and 68, one of the regions can be selected. The designated number is inversion-indicated. In FIG. 20, 1 "East Asia" is designated. It is known that people have a characteristic feeling about colors in each region of the world. The ROM 101 (see FIG. 14) is also stored with masking coefficients suitable for the characteristic feelings of people in the different regions, and image data are corrected with a masking coefficient suitable for the designated region. Further, it is also effective to adjust another parameter to the region.

Figure 21:
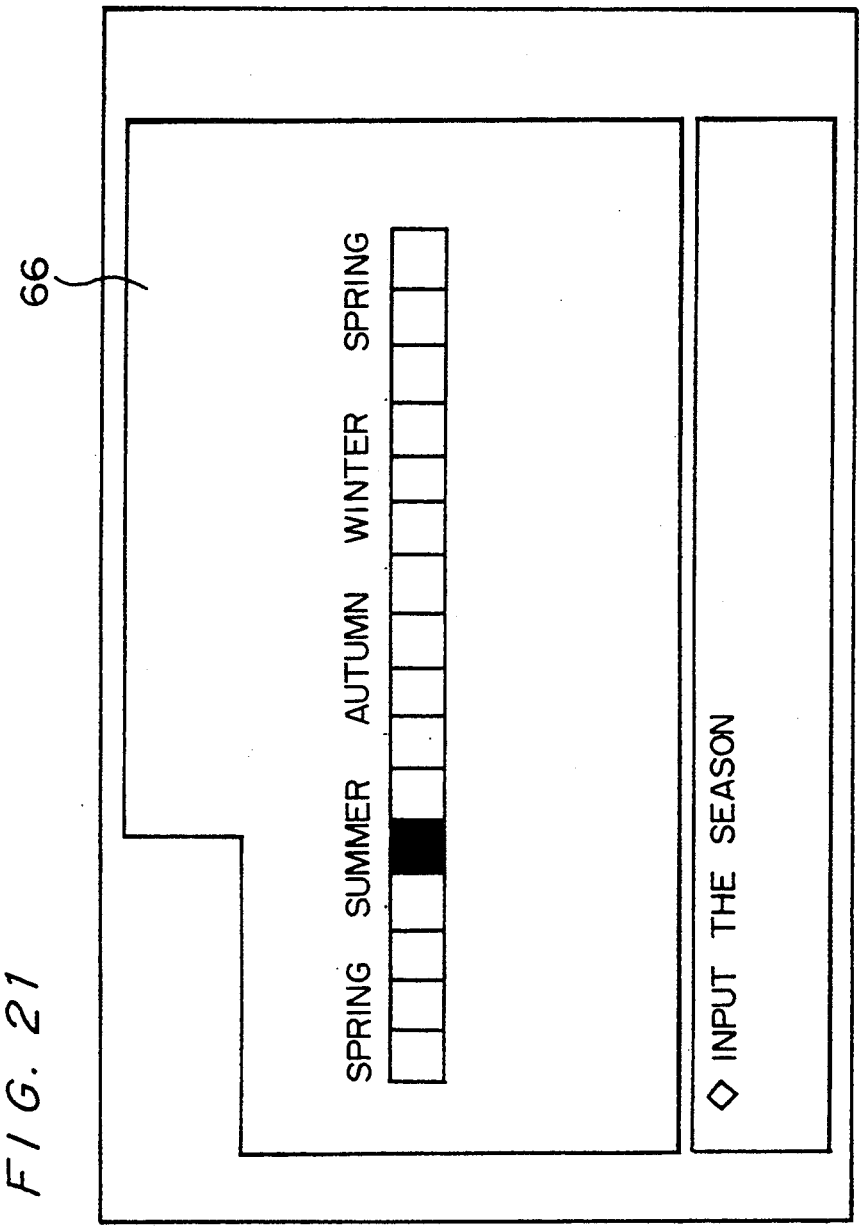
FIG. 21 is a plan view of a picture which appears on the liquid crystal display for input of the season.

Additionally, by using the function key 73, the season when a reproduced image is to be observed can be input, and one of the parameters is changed in accordance with the input data. When the function key 73 is turned on, a picture of FIG. 21 appears on the display 66. Seasons including in-between seasons are indicated on the picture, and one of them is selected by use of the dials 67 and 68. The season indicated with a lit indication segment is selected. In FIG. 21, "summer" is selected.

Figure 22:
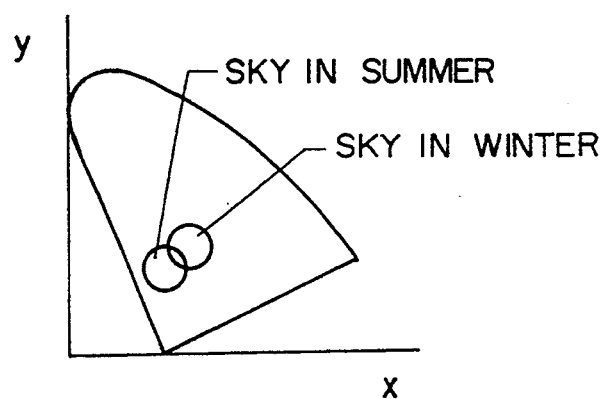
FIG. 22 is a chromaticity diagram.

As shown in a chromaticity diagram of FIG. 22, taste in colors in summer is in the chromatic side compared with that in winter. The marks "sky in summer" and "sky in winter" in the diagram indicate colors to be reproduced from the same color of the sky which is read by the CCD color sensor 5 such that the reproduced colors will make a favorable impression to the observers in summer and in winter respectively. The ROM 101 (see FIG. 14) is stored with making coefficients suitable for the seasons, and image data are corrected with a masking coefficient suitable for the designated season. Further, it is effective to adjust another parameter to the season.

A calendar can be incorporated in the control section of the machine as well as or instead of the season input means. The calendar recognizes the date, and the date of image formation is automatically transmitted to the controller 91. The image processing unit 7 carries out image processing with correction data suitable for the season.

Figure 23:
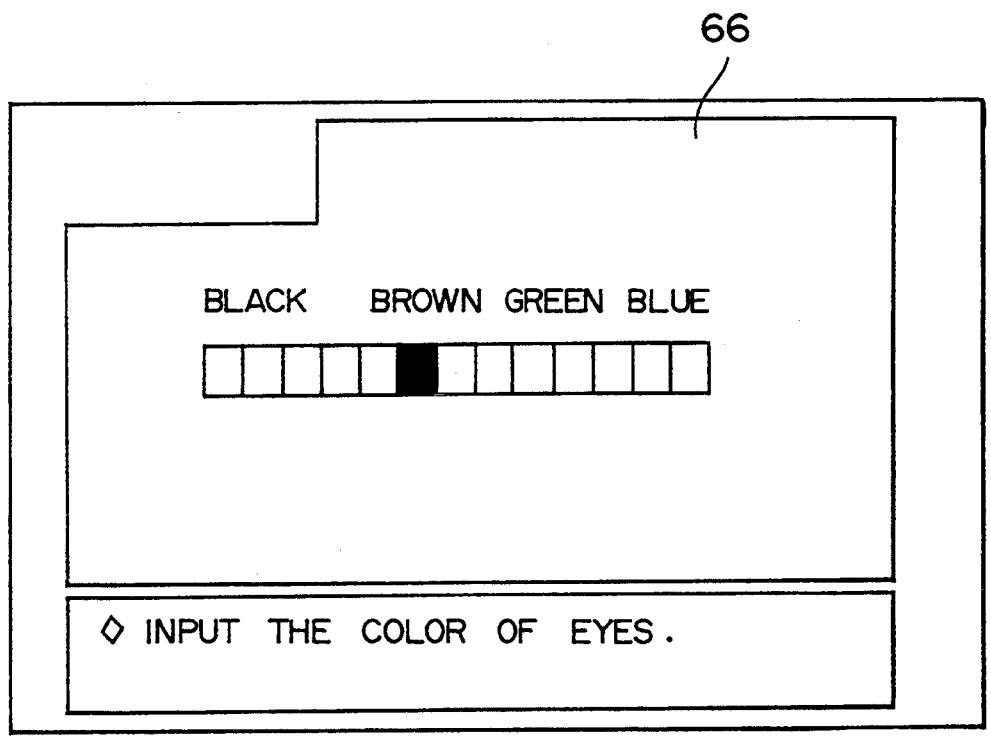
FIG. 23 is a plan view of a picture which appears on the liquid crystal display for input of the color of the observer's eyes.

Furthermore, by using the function key 74, one of the parameters can be changed in accordance with the color of the observer's eyes. When the function key 74 is turned on, a picture of FIG. 23 appears on the display 66. One of black, brown, green, blue and in-between colors can be selected by use of the dials 67 and 68. The color indicated with a lit indication segment is selected. In FIG. 23, brown is selected.

People with eyes of different colors have different sensitivities to colors. For example, people with blue eyes are highly sensitive to reddish and yellowish colors. The ROM 101 (see FIG. 14) is stored with masking coefficients suitable for different colors of eyes, and the image processing is carried out with a masking coefficient suitable for the input color of eyes. It is effective to adjust another parameter to the color of eyes.

In the embodiment, factors determining the impression of a reproduced image are input on the display 66 of the operation panel 60. It is also possible to provide the operation panel 60 with magnetic card reading means for reading data about the factors stored in a magnetic card 77 (see FIGS. 8, 10, 14, 15 and 18).

Although the present invention has been described in connection with the preferred embodiment above, it is to be noted that various changes and modifications are possible to those who are skilled in the art. Such changes and modifications are to be understood as being within the scope of the present invention.

The present invention is applicable not only to a color copying machine which directly reads an original image and reproduces the image but also to a color printer which makes an image from image data transmitted from a host computer. The image processing unit 7 may comprise other components.

What is claimed is:

1. A color image forming apparatus comprising:
   data receiving means for receiving image data of an original image, the image data indicating primary three colors;
   image processing means for making print data from the image data received by the receiving means by using at least one of parameters, shading correction data, a reflectance-density conversion characteristic, a UCR/BP characteristic, a masking coefficient, color balance data and $\gamma$ correction data;
   image forming means for forming an image on a recording medium in accordance with the print data made by the image processing means and developing the image into a color image on a sheet;
   inputting means for inputting a lighting condition of the formed image; and
   adjusting means for adjusting at least one of the parameters of the image processing means in accordance with the lighting condition input by the inputting means.

2. A color image forming apparatus as claimed in claim 1, wherein the lighting condition is one of items including sunlight, an incandescent lamp and a fluorescent lamp.

3. A color image forming apparatus comprising:
   data receiving means for receiving image data of an original image, the image data indicating primary three colors;
   image processing means for making print data from the image data received by the receiving means by using at least one of parameters, shading correction data, a reflectance-density conversion characteristic, a UCR/BP characteristic, a masking coefficient, color balance data and $\gamma$ correction data;
   image forming means for forming an image on a recording medium in accordance with the print data made by the image processing means and developing the image into a color image on a sheet;
   inputting means for inputting a region where the color image forming apparatus is installed; and
   adjusting means for adjusting at least one of the parameters of the image processing means in accordance with the region input by the inputting means.

4. A color image forming apparatus as claimed in claim 3, wherein the region is one of regions into which a world is divided.

5. A color image forming apparatus comprising:
   data receiving means for receiving image data of an original image, the image data indicating primary three colors;
   image processing means for making print data from the image data received by the receiving means by using at least one of parameters, shading correction data, a reflectance-density conversion characteristic, a UCR/BP characteristic, a masking coefficient, color balance data and $\gamma$ correction data;
   image forming means for forming an image on a recording medium in accordance with the print data made by the image processing means and developing the image into a color image on a sheet;
   inputting means for inputting a color of eyes of a person to observe the formed image; and
   adjusting means for adjusting at least one of the parameters of the image processing means in accordance with the color of eyes input by the inputting means.

6. A color image forming apparatus as claimed in claim 5, wherein the color of eyes is one of items including blue, brown, green and black.

7. A color image forming apparatus comprising:
   data receiving means for receiving image data of an original image, the image data indicating primary three colors;
   image processing means for making print data from the image data received by the receiving means by using at least one of parameters, shading correction data, a reflectance-density conversion characteristic, a. UCR/BP characteristic, a masking coefficient, color balance data and $\gamma$ correction data;
   image forming means for forming an image on a recording medium in accordance with the print data made by the image processing means and developing the image into a color image on a sheet;
   inputting means for inputting a season when the formed image is observed; and
   adjusting means for adjusting at least one of the parameters of the image processing means in accordance with the season input by the inputting means.

8. A color image forming apparatus as claimed in claim 7, wherein the season is one of items including spring, summer, autumn and winter.

9. A color image forming apparatus comprising:
   data receiving means for receiving image data of an original image, the image data indicating primary three colors;
   image processing means for making print data from the image data received by the receiving means by using at least one of parameters, shading correction data, a reflectance-density conversion characteristic, a UCR/BP characteristic, a masking coefficient, color balance data and $\gamma$ correction data;
   image forming means for forming an image on a recording medium in accordance with the print data made by the image processing means and developing the image into a color image on a sheet;
   calendar means for recognizing a date when image formation is carried out; and
   adjusting means for adjusting at least one of the parameters of the image processing means in accordance with the date of image formation recognized by the calendar means.

* * * * *